United States Patent

[11] 3,597,582

| [72] | Inventors | John P. Goode<br>Rochester;<br>John J. Saeli, Rochester; James P. Sformo, Spencerport, all of, N.Y. |
|------|-----------|------------|
| [21] | Appl. No. | 789,686 |
| [22] | Filed | Jan. 8, 1969 |
| [45] | Patented | Aug. 3, 1971 |
| [73] | Assignee | Sybron Corporation<br>Rochester, N.Y. |

[54] ELECTRODE RETAINING CHUCK HANDLE ASSEMBLY WITH ADAPTER UNIT
3 Claims, 6 Drawing Figs.

[52] U.S. Cl. .................................................. 219/144,
128/218, 128/303.14, 128/303.18
[51] Int. Cl. ........................................... A61b 17/36,
B23k 9/28, A61b 17/40
[50] Field of Search ................................ 219/138,
234; 128/218, 303, 303.1, 303.13, 303.14, 303.18,
303.19

[56] References Cited
UNITED STATES PATENTS
| 1,717,480 | 6/1929 | Wappler | 128/303.18 |
| 2,622,595 | 12/1952 | Kollsman | 128/218 P |
| 2,828,748 | 4/1958 | August | 128/303.14 |

Primary Examiner—J. V. Truhe
Assistant Examiner—Hugh D. Jaeger
Attorney—Theodore B. Roessel ABSTRACT: An electrosurgical chuck handle assembly with an adapter unit is disclosed. The chuck handle assembly is designed to provide a means for retaining the electrode used for cutting or coagulating and is held firmly with provisions for changing the electrode. The chuck handle assembly is constructed of materials having sufficient heat distorting properties to allow the handle to distort whenever the assembly is sterilized by heating, thereby rendering the handle ineffective for further reuse. The distortion feature helps eliminate open circuits in the assembly which occur from repeated heat sterilizing.

Also disclosed is an adapter unit for receiving the terminal plug of the chuck handle assembly and electrically connecting the terminal plug to an existing electrosurgical unit. The adapter unit contains novel locking means whereby the terminal plug is retained within the adapter unit in an electrical contact position thereby preventing inadvertent disconnection from the electrosurgical unit.

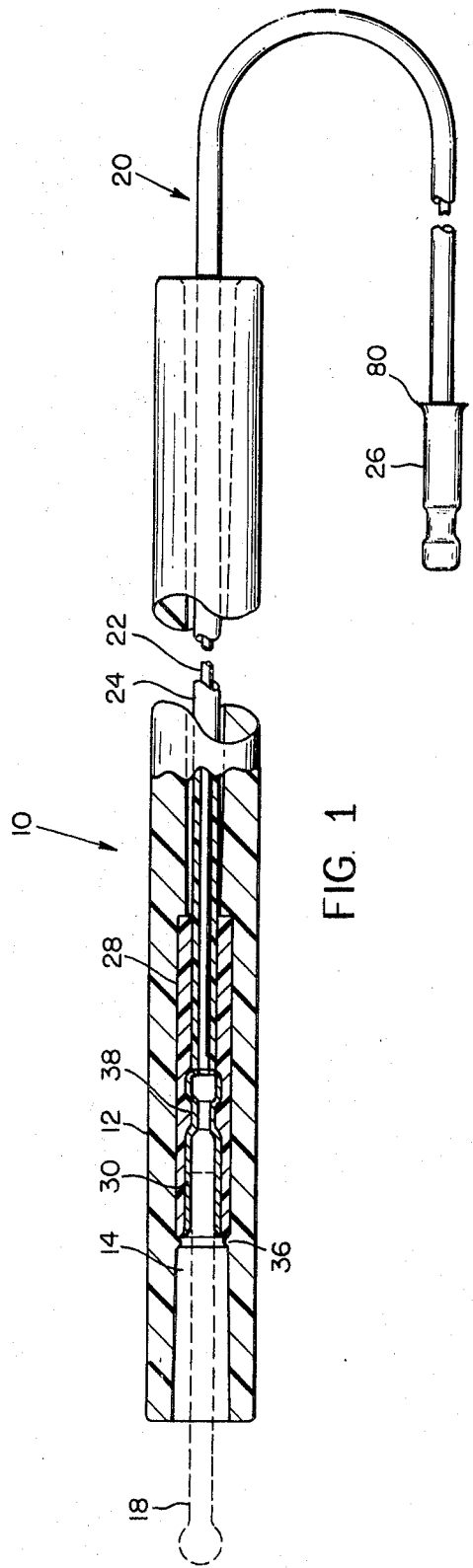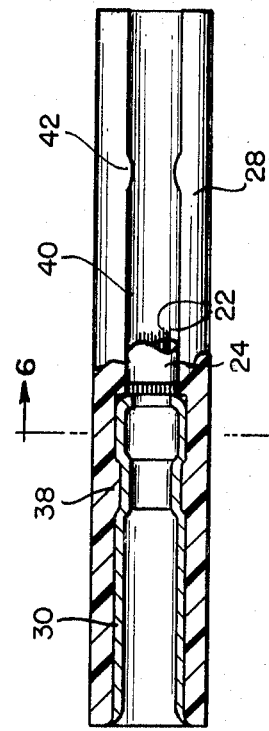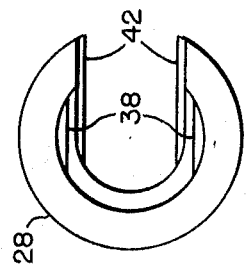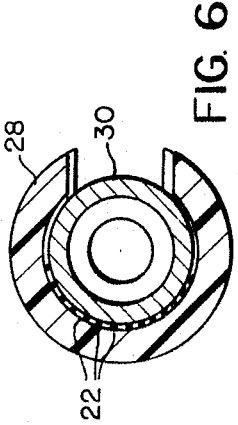
FIG. 1
FIG. 2
FIG. 3
FIG. 6
INVENTORS
JOHN P. GOODE
JOHN J. SAELI
JAMES P. SFORMO
BY Theodore B. Roessel
ATTORNEY

INVENTORS
JOHN P. GOODE
JOHN J. SAELI
JAMES P. SFORMO

BY Theodore B. Roemel
ATTORNEY

ELECTRODE RETAINING CHUCK HANDLE ASSEMBLY WITH ADAPTER UNIT

BACKGROUND OF THE INVENTION

This invention relates to equipment for an electrosurgical unit generally, and more particularly to a disposable electrode retaining chuck handle assembly with an adapter unit, the chuck handle assembly being disposable after use and having built in safety features to prevent the chuck handle from being reused after heat sterilization.

Chuck handle assemblies of the type encompassed by the invention are designed to provide a handle or means for holding an electrosurgical electrode for use by a physician in tube cutting, sparkgap cutting and the like. The chuck handle assembly is connected through an electrical conductor to an electrosurgical unit such as the Model CSV BOVIE, manufactured by the Ritter Equipment Company, a division of Sybron Corporation. The electrical circuit for this unit is completed by placing an inactive electrode underneath the patient and connecting this electrode to the electrosurgical unit, which is appropriately grounded.

Prior art chuck handle assemblies heretofor have been constructed of materials such as Bakelite with heavy electrical conductors for electrically connecting the handle to the electrosurgical unit. This type of construction was required since the assembly has to withstand repeated usages after heat sterilization by known methods. In such practices, potential safety hazards were found since repeated heat sterilization of the chuck handle assembly and electrical conductor would cause breaks to occur in the insulation of the electrical conductor thereby potentially subjecting the physician to severe burns by means of shortcircuiting through his body. In order to alleviate this problem, the subject invention was developed.

SUMMARY OF THE INVENTION

The present invention overcomes the difficulties and limitations found in the prior art chuck handle assemblies by providing a simple, chuck handle assembly which is packaged, sterilized for one time use only by the physician. The chuck handle assembly is constructed of materials which have heat distorting properties sufficient to allow the handle to distort whenever an attempt is made to sterilize the unit for repeated usage. Since the invention is designed for a one time use only, the assembly is also constructed of materials that are easily disposed of through normal hospital disposal means, such as chopping or incinerating.

In order that the improved chuck handle assembly of the invention may be used with existing electrosurgical units, there is also provided an adapter unit for receiving the terminal plug of the assembly and locking the terminal plug in electrical contact with the electrosurgical unit to prevent accidental disconnection of the chuck handle assembly from the electrosurgical unit.

Accordingly, it is an object of this invention to provide a new and novel chuck handle assembly which is constructed of heat distorting materials sufficient to allow the chuck handle assembly to distort whenever an attempt is made to sterilize the unit by heating means.

Another object of the invention is to provide a new and novel chuck handle assembly which is designed for one time use only and which may be discarded after a use by the physician.

Still another object of the invention is to provide a new and novel throwaway type chuck handle assembly which may be packaged sterilized for one time use by the physician.

Yet another object of this invention is to provide a new and novel chuck handle assembly having the above-mentioned features which may be used with existing electrosurgical units by means of a new and novel adapter unit of the invention.

Still another object of the invention is to provide a new and novel adapter unit for receiving the electrical terminal plug of the chuck handle assembly and locking the terminal plug to the electrosurgical unit by locking means contained within the adapter unit thereby preventing accidental disconnection of the terminal plug from the electrosurgical unit.

These and other objects and advantages of the invention will become apparent from a study of the attached drawings and from a reading of the description of the preferred embodiment.

BRIEF DESCRIPTION OF THE DRAWINGS

FIG. 1 is an elevational view, partially in section, showing the chuck handle assembly of the invention;

FIG. 2 is an elevational view, partially in section, of the means for electrically connecting the conductor to the electrode contained within the chuck handle assembly;

FIG. 3 is an enlarged end view of the electrical connecting means shown in FIG. 2;

FIG. 6 is a cross-sectional view taken along line 6–6 of FIG. 2 showing the terminal wire electrically connected.

DESCRIPTION OF THE PREFERRED EMBODIMENT

Figure 4:
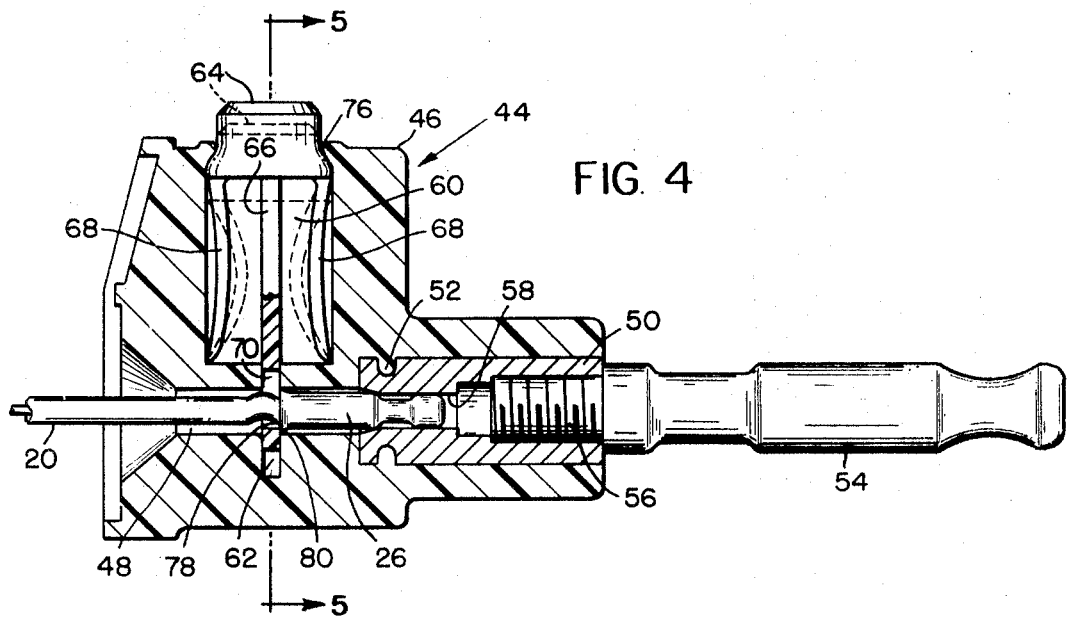
FIG. 4 is a cross-sectional view of the adapter unit for receiving the electrical terminal plug.

Referring more particularly to the drawings, there is shown generally at 10 the electrode retaining chuck handle assembly of the invention and comprises an elongated chuck handle 12 having a first bore 14 extending longitudinally therethrough. Rigidly held in one end of the first bore 14, as hereinafter described is an electrode 18, illustrated by dashed lines in FIG. 1.

The opposite end of the bore 14 surrounds an electrical conductor, shown generally as the numeral 20, which consists of a stranded electrical conductor wire 22 surrounded by an electrical insulation 24. The electrical conductor 20 has fixed on the end thereof a terminal plug 26 hereinafter referred to as the first terminal plug.

Positioned within the first bore 14 of the chuck handle 12 is the means for electrically connecting the electrical conductor 20 to the electrode 18 and consists of an elongated sleeve 28, shown generally in FIG. 2. The elongated sleeve 28 has fixed in one end thereof a second terminal plug 30 which rigidly holds the electrode 18 in position and electrically connects the electrode 18 to the stranded conductor wire 22 as shown in FIG. 6.

The elongated sleeve 28 is retained within the first bore 14 by means of an annular ridge 36 formed on the inside of the first bore 14. The annular ridge 36 serves as the first retaining means for retaining the elongated sleeve 28 within the first bore 14.

The second terminal plug 30 is retained in the sleeve 28 by means of a second ridge 38 formed internally on the second bore 40, said second ridge 38 serving as a second retaining means for retaining the second terminal plug 30 within the elongated sleeve 28.

Formed on the interior of the second bore 40 is a third annular ridge 42 having an internal diameter smaller than the external diameter of the electrical conductor 20. The third annular ridge 42 thereby serves as the third retaining means to retain the electrical conductor 20 within the first bore 14. In the embodiment shown in FIG. 2, the third annular ridge 42 is formed on the interior of the second bore 40. However, it is clear that the third annular ridge 42 may also be formed on the first bore 14 without departing from the spirit and scope of the invention.

The chuck handle 12 and elongated sleeve 28 are formed from a heat distorting polystyrene having a heat distorting property sufficient to cause the chuck handle 12 and the elongated sleeve 28 to distort whenever an attempt is made to sterilize the chuck handle assembly 10 by means of heat sterilization. An example of a material having this characteristic would be Union Carbide's TMDE 6500, White 9045, High-Impact Polystyrene.

In assembling the chuck handle assembly 10, the stranded wire 22, with a portion of its insulation 24 removed, is positioned within the elongated sleeve 28 as shown in FIG. 6. The second terminal plug 30 is then positioned over the stranded wire 22, as shown in FIG. 6, with the elongated sleeve 28 then being compressed sufficiently to allow it to pass over the annular ridge 36 formed on the first bore 14 and be inserted in position in the bore 14. The chuck handle assembly 10 may then be packaged sterilized by known means other than by heat sterilization.

When the physician is ready to use the chuck handle assembly, he simply removes the sterile package from the assembly and inserts a presterilized electrode 18 into one end of the assembly and plugs the first terminal plug 26 into the adapter unit hereinafter described on the electrosurgical unit. When the physician has completed his use of the chuck handle assembly, the entire unit may be disposed of by incinerating or chopping. Since the chuck handle 12 and the elongated sleeve 28 are constructed of materials which distort at the temperatures normally used for heat sterilization in hospitals, any attempt to heat sterilize the chuck handle assembly 10 for reuse results in a deformed check handle 12 which is incapable of retaining an electrode 18.

From the above, it is clear that there has been provided a new a novel chuck handle assembly which has the built-in safety feature that prevents the handle from being heat sterilized and reused. This feature allows the physician to use the handle without suffering inadvertent burns to his hands caused by the beforementioned short circuiting.

Figure 5:
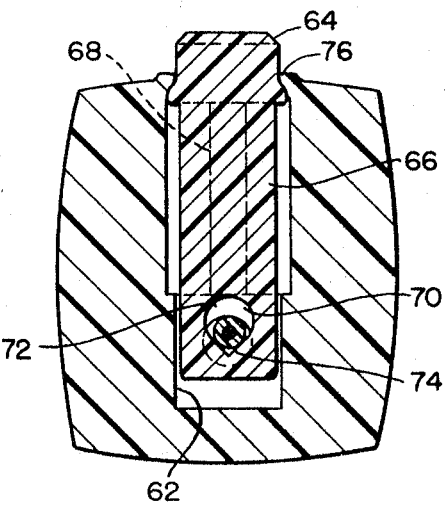
FIG. 5 is a cross-sectional view taken along line 5–5 of FIG. 4, showing the means for locking the electrical terminal plug in the adapter unit.

Referring now more particularly to FIGS. 4 and 5, the adapter plug of the invention is shown generally as the numeral 44 and comprises a housing 46 containing a first passageway 48 in the lower portion thereof extending longitudinally therethrough. The housing 46 may be formed of plastic or some other suitable electrically insulating material and contains a bushing 50 which is molded within the first passageway and rigidly held by means of the ringlike protuberance 52. The bushing 50 may be formed of brass or some other suitable electrically insulating material and contains a bushing 50 which is molded within the first passageway and rigidly held by means of the ringlike protuberance 52. The bushing 50 may be formed of brass or some other suitable electrical conducting material and has fixed to one end thereof an external electrical member 54 in the form of an electrical plug having sufficient diameter and length to be retained by the existing electrosurgical unit. The external electrical member 54 may be removably mounted in the bushing 50 by means of the thread 56 or may be formed integrally with the bushing 50.

The central portion of the bushing 50 contains a bore 58 of sufficient diameter to receive the first terminal plug 26 fixed to the end of the electrical conductor 20. The housing 46 also has formed therein a second passageway 60 perpendicular to the first passageway 48 and terminating in a slot 62 which extends through the first passageway 48. The second passageway 60 contains the locking means for locking the first terminal plug 26 in the adapter plug 44 thereby assuring electrical connection of the chuck handle assembly 10 with the existing electrosurgical unit.

The locking means comprises a locking button 64 having an elongated plate member 66 formed on the bottom thereof and extending downwardly into the second passageway 60 and the slot 62. Formed on the outer edges of the locking button 64 are resilient means 68 in the form of a plurality of fingerlike members shown in FIG. 4.

The plate members 66 has formed in the lower portion thereof an aperture 70 comprising an upper semicircular portion 72 which terminates in a lower V-portion 74. The diameter of the upper semicircular portion 72 is sufficient to allow the first terminal plug 26 to pass therethrough whenever the plug is inserted into the adapter plug 44.

The locking button 64 is retained within the second passageway 60 by means of the annular ridge 76 formed on the upper portion of the second passageway 60. The resilient means 68 may be formed of plastic or some other suitable material having resilient properties sufficient to allow the resilient means 68 to deform as shown by the dotted lines in FIG. 4 whenever the locking button 64 is depressed within the second passageway 60. The resilient means 68 may also be obtained by using a compression spring without departing from the spirit and scope of the invention.

Referring now to FIG. 5, there is shown a sectional view of the adapter plug 44 taken along line 5-5 of FIG. 4. In operation, the locking button 64 is depressed sufficiently to line up the upper semicircular portion 72 with the first passageway 48. In this position, the resilient means 68 are deformed to the position shown by the dotted lines in FIG. 4. The first terminal plug 26 is inserted into the first passageway 48, passing through the aperture 70 and into the bore 58 formed in the metallic bushing 50. Upon release of the locking button 64, the resilient means 68 returns the locking button 64 to the locking position shown in FIG. 4 and the V-portion 74 of the aperture 70 engages the electrical conductor 20 on the bottom thereof at the position shown as the numeral 78 in FIG. 4, deforming the electrical conductor 20 somewhat as the plate member 66 returns to the locking position. The flange 80 of the first terminal plug 26 is unable to pass through aperture 70 and is thereby securely locked within the adapter plug 44 in electrical contact with the metallic bushing 50.

To release the first terminal plug 26 from the adapter plug 44, the operator simply depresses the locking button 64 sufficiently to line up the upper semicircular portion 72 with the first passageway 48 thereby allowing the flange 80 to pass through aperture 70.

From the foregoing, it can be seen that new and novel means have been provided for accomplishing all of the objects and advantages of the invention. Nevertheless, it is apparent that many changes in details of construction or arrangement of the parts of the invention may be made without departing from the spirit and scope of the invention as expressed in the accompanying claims and the invention is not to be limited to the exact matters shown and described since only the preferred embodiments have been given by way of illustration only.

Having described the invention, we claim:

1. An electrode retaining chuck handle assembly comprising:
   a. a first terminal plug;
   b. a flexible electrical conductor having one end electrically connected to said first terminal plug and a second end;
   c. an electrically insulating chuck handle having an axial bore therethrough and a ridge formed integral said bore adjacent one end thereof;
   d. an electrically insulating sleeve portion positioned within said chuck handle bore with one end of said sleeve engaging said ridge for retaining said sleeve within said chuck handle bore, said sleeve portion having an axial bore therethrough and a second ridge formed integral said sleeve portion bore adjacent one end thereof;
   e. a second terminal plug positioned within said sleeve portion bore with one end of said second terminal plug engaging said second ridge for retaining said plug within said sleeve bore, said plug being adapted to receive and retain therein one end of an electrode inserted into said chuck handle bore;
   f. said flexible electrical conductor having its second end passing into said chuck handle bore and sleeve portion bore and electrically connected to said second terminal plug; and
   g. said chuck handle and said sleeve portion constructed of a material having a heat distorting property sufficient to allow distortion of said handle whenever said handle is sterilized by heating thereby rendering said handle ineffective for retaining the electrode.

2. The assembly as defined in claim 1 wherein said chuck handle and said elongated sleeve are constructed of polystyrene.

3. An electrode retaining chuck handle assembly as set forth in claim 1 wherein said sleeve portion includes a third ridge formed integral said sleeve portion bore adjacent another end thereof said third ridge engaging the second end of said electrical conductor for retaining said conductor within said bore.